United States Patent Office 3,446,898
Patented May 27, 1969

3,446,898
6,9 DIOXA-1-SPIRO[4.4] NONENE IN THE KILLING OF INSECTS
Wen-Hsuan Chang, Gibsonia, Pa., assignor to PPG Industries, Inc., Pittsburgh, Pa., a corporation of Pennsylvania
No Drawing. Continuation-in-part of application Ser. No. 629,374, Apr. 10, 1967. This application Aug. 17, 1967, Ser. No. 661,209
Int. Cl. A01n 9/28; C07d 13/04
U.S. Cl. 424—278   3 Claims

ABSTRACT OF THE DISCLOSURE

This application relates to the use of compounds corresponding to the following formula as insecticides:

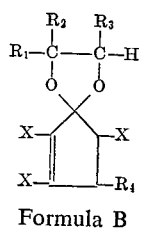

Formula B

In the above formula, X represents chlorine or bromine and $R_1$, $R_2$ and $R_3$ are each selected from the class consisting of hydrogen and alkyl, cycloalkyl, phenyl, alkoxyalkyl, phenyloxyalkyl and hydroxyalkyl radicals, usually having up to 20 carbon atoms and preferably 1 to 10 carbon atoms. $R_4$ is either the structure:

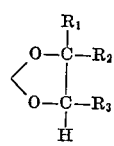

or the structure:

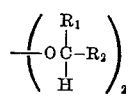

where $R_1$, $R_2$ and $R_3$ are as above.

In the foregoing Formula B, it is to be noted that the substituents designated as $R_1$, $R_2$ and $R_3$ occur more than once in each formula. In these instances, each $R_1$ group may refer to a different radical selected from the group set forth, and each $R_2$ and each $R_3$ may similarly be different. Such compounds are obtained, for example, when produced by a method in which successive reactions with an alcohol are employed and a different alcohol is used in each step. Compounds of this type are included within the scope of the various embodiments of the invention disclosed and claimed herein.

CROSS REFERENCES TO RELATED APPLICATIONS

This application is a continuation-in-part of U.S. application Ser. No. 629,374, filed April 10, 1967, now U.S. Patent 3,369,966, issued Feb. 20, 1968, which in turn is a continuation-in-part of U.S. application Ser. No. 234,846, filed Nov. 1, 1962 (now abandoned).

STATE OF THE PRIOR ART

The reaction of hexachlorocyclopentadiene with an excess of ethylene glycol has been reported heretofore by Newcomer and McBee in the Journal of the American Chemical Society, vol. 71, page 946 (1949). According to this article, the reaction when carried out at 50° C. to 60° C. produces 1,2,3,4,11,12,13,14-octachloro-6,9,15,18-tetraoxadispiro[4.4.4.4] - 1,3,11,13 - octadecatetraene, which has the formula:

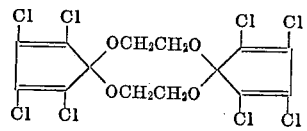

DESCRIPTION OF THE INVENTION

It has now been found that the reaction of hexahalocyclopentadiene with ethylene glycol or a polyol of the ethylene glycol type, i.e., having hydroxyl groups on adjacent carbon atoms, can be carried out in such a way as to produce several products quite different from that reported in the above article which are useful as pesticides. The temperature of the reaction and the amount of base catalyst employed determines the particular nature of the product obtained.

While the compounds referred to are basically all produced from hexahalocyclopentadiene and a polyol having adjacent hydroxyl groups in the presence of a base, they correspond to the general formulas which are set forth below:

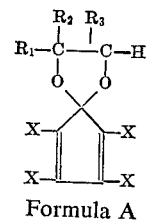

Formula A

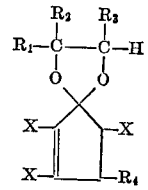

Formula B

In the above formulas, X represents chlorine or bromine and $R_1$, $R_2$ and $R_3$ are each selected from the class consisting of hydrogen and alkyl, cycloalkyl, phenyl, alkoxyalkyl, phenyloxyalkyl and hydroxyalkyl radicals, usually having up to 20 carbon atoms, and preferably 1 to 10 carbon atoms. $R_4$ is either the structure:

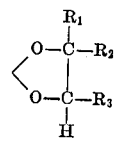

or the structure:

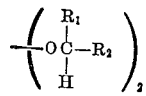

where $R_1$, $R_2$ and $R_3$ are as above.

In the foregoing Formula B, it is to be noted that the substituents designated at $R_1$, $R_2$ and $R_3$ occur more than once in each formula. In these instances, each $R_1$ group may refer to a different radical selected from the group set forth, and each $R_2$ and $R_3$ may similarly be different. Such compounds are obtained, for example, when produced by a method in which successive reactions with an alcohol are employed and a different alcohol is used in each step. Compounds of this type are included within the scope of the various embodiments of the invention disclosed and claimed herein.

In producing the compounds of the formulas set forth above, any polyol having hydroxyl groups attached to adjacent carbon atoms can be employed. Such polyols correspond to the formula:

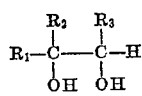

where $R_1$, $R_2$ and $R_3$ are as defined above; these radicals in the polyol correspond to those in the above formulas. Examples of such polyols used to produce the various compounds above include aliphatic polyols such as ethylene glycol, 1,2-propanediol, 1,2-butanediol, 2-methyl-2,3-butanediol, 1,2-pentanediol, 2,3-pentanediol, 1,2-hexanediol, 5,6-decanediol, 2-methyl - 3,4 - pentanediol and 2,2-dimethyl-3,4-butanediol; alicyclic polyols such as cyclohexyl-1,2-ethanediol; aryl-substituted polyols such as phenyl-1,2-ethanediol; alkoxy-substituted polyols such as 1-methoxy-2,3-propanediol; aryloxy-substituted polyols such as 1-phenoxy-2, 3-propanediol; and polyols containing additional hydroxyl groups in addition to those on the adjacent carbon atoms, such as 1,2,6-hexanetriol. In each instance, the polyol must have at least 2 carbon atoms, and for most purposes it is preferred to use polyols having a total of between 2 and 30 carbon atoms in which each R group is either hydrogen or alkyl of up to 20 carbon atoms. It has been found further that the reaction is best carried out with polyols in which the hydroxyl groups are both bonded to either primary or secondary carbon atoms, i.e., polyols in which $R_2$ is hydrogen.

The alcohols employed in preparing the compounds of this invention may contain additional substituents which do not prevent the reaction. As can be seen from the above, even compounds having more than two hydroxyl groups may be employed. The preferred alcohols comprise compounds containing only carbon, hydrogen and oxygen.

Hexahalocyclopentadiene, as used throughout the specification, refers to a chloro- or bromo-substituted cyclopentadiene, for example hexachlorocyclopentadiene or hexabromocyclopentadiene.

The reactions to produce the compounds of this invention are base-catalyzed. While essentially any base catalyst, as that term is understood in the art, can be used, it is preferred to employ inorganic bases, including the hydroxides, alkoxides and oxides of metals such as lithium, potassium, sodium, calcium, magnesium, and the like. The metals themselves, e.g., metallic sodium, can also be employed, and provide quite satisfactory results. Organic bases such as amines are less satisfactory since they tend to reduce the yield by promoting side reactions which compete with the desired reaction. The most desirable bases from an economic standpoint are the hydroxides of the alkali metals and these also provide the best results.

As is more fully set forth hereinbelow, the amount of base employed, as well as the temperature at which the reaction is carried out, determines the particular nature of the product resulting from the reaction of the hexahalocyclopentadiene and the polyol. Aside from these, however, other reactions conditions are not critical and may be varied widely. For example, the reaction can be carried out in the presence of a solvent if desired, although quite often the excess polyol or hexahalocyclopentadiene is used as the only solvent. Other inert solvents such as ethylene glycol dimethylether, tetrahydrofuran, acetamide, and the like, can be used with similar effectiveness, and when the polyol employed is a solid, it is often desirable to have a solvent present.

The compounds corresponding to Formula A above are produced by the reaction of hexahalocyclopentadiene with a polyol in the presence of a base, as defined above. The temperature at which the reaction is carried out is below about 50° C. and preferably below about 35° C. In order to obtain the product in good yield. The temperature may also be below room temperature, for instance, 0° C. or lower, if desired.

Compounds of Formula B above are also produced during the reaction as described above to produce compounds of Formula A, although the yield is usually very low unless sufficient polyol, i.e., at least about 2 moles per mole of hexahalocyclopentadiene, as well as sufficient base, again at least about 2 moles per mole of hexahalocyclopentadiene, are employed.

Using these proportions of reactants, good yields of compounds of the Formula B are produced and, while low temperatures such as those described above can be used, the reaction may also be carried out at temperatures up to about 120° C. or higher, and it is preferred to use temperatures of at least about 50° C. The Formula B compounds are also conveniently made by reaction of compounds of the Formula A with additional polyol in the presence of additional base, using temperatures between about 40° C. and about 120° C. This reaction can be carried out with a different alcohol from that used to make the compound of the Formula A; it may be any hydroxyl groups either on adjacent or non-adjacent carbon atoms. For example, in addition to those polyols enumerated above, polyols such as 1,3-propanediol, 1,4-butanediol, 2,2-dimethyl-1,3-propanediol, trimethylolpropane, pentaerythritol, polyethylene glycols and the like, as well as monohydric alcohols such as methanol, ethanol, heptanol and octanol, and other alcohols of the formula.

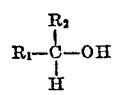

where $R_1$ and $R_2$ are as above, can be employed. When Compound A is reacted further with a polyol having hydroxyls on adjacent carbon atoms, the $R_4$ group in Formula B has the structure:

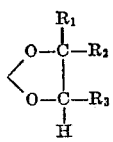

where $R_1$, $R_2$, and $R_3$ are again derived from the polyol and are as defined above. When, however, a monohydric alcohol or a polyol having hydroxyls on non-adjacent atoms is used in making the compound of the Formula B, the $R_4$ group is of the structure:

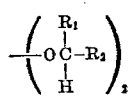

where $R_1$ and $R_2$ are as defined above. In these instances, one hydroxyl group from each of two alcohol molecules reacts with the hexahalocyclopentadiene nucleus, whereas in the case of the polyol having adjacent hydroxyl groups, both hydroxyl groups reacting with the hexahalocyclopentadiene are attached to the same polyol molecule.

The compounds of Formula B can also be produced by changing the order of reaction, that is, by first reacting hexahalocyclopentadiene with the monohydric alcohol to produce a compound of the structure:

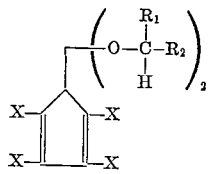

and then reacting this compound with the polyol.

It may be noted that the double bond in Formula B is shown in the 3-position. However, depending upon the particular reactants and reaction conditions, the double bond in all or part of the product obtained in particular cases may be in the 2-position. The compounds are considered equivalent for purposes of this invention, and names and formulas herein are intended to include both isomers as well as the mixture.

It may be noted that the ranges of conditions and proportions which produce the several compounds depicted above overlap. In such instances, mixtures of the different products may be obtained; however, by proper choice of the conditions and proportions, good yields of any of the above compounds are achieved.

The several compounds to which this invention relates will be further described by reference to the following examples. These examples, being illustrative, should not be construed as limiting the invention to their details.

EXAMPLE I 1,2,3,4-tetrachloro-6,9-dioxa-1,3-spiro[4.4]nonadiene

A two-liter, round bottom flask was charged with one mole of hexachlorocyclopentadiene. A solution of 137 grams (2.10 moles, 85 percent purity) of potassium hydroxide in ethylene glycol (496.0 grams, 8.0 moles) was added dropwise at 25° C. to 33° C. When two-thirds of the glycol solution had been added, there was one liquid phase and some precipitated potassium chloride. The remainder of the solution was added and the reaction mixture was stirred at 25° C. to 30° C. for 20 hours; the pH was then 8.0. One liter of water was added and the layers were separated. The water layer was extracted with ether and the combined organic layers were washed with saturated sodium chloride solution and the organic solvent removed under vacuum. When the organic layer was nearly evaporated to dryness, ligroin was added and the solution cooled to −78° C. and filtered. There was obtained 206 grams of the above product.

Analysis. — Calculated for $C_7H_6Cl_4O_2$: Carbon, 32.01%; Hydrogen, 1.54%; Chlorine, 54.15%. Found: C, 31.97%; H, 1.63%; Cl, 54.02%.

Obviously, when hexabromocyclopentadiene is employed, the tetrabromo equivalent will be formed.

EXAMPLE II 1,2,3,4-tetrachloro-7-methyl-6,9-dioxa-1,3-spiro[4.4]nonadiene

A three-necked, two-liter, round bottom flask was charged with one mole (73 grams) of hexachlorocyclopentadiene, 2 moles (152.0 grams) of 1,2-propanediol and 300 milliliters of dimethoxyethane. To this solution 2.0 moles (132.4 grams, 85 percent purity) of potassium hydroxide were added in portions while the temperature was kept at 26° to 33° C. by external cooling. It took 45 minutes for the addition. The heterogeneous mixture was stirred at 26° C. overnight; the resultant solution had a pH of 8.5. To this solution, water was added and the organic layer was washed with water six times, dissolved in ether and filtered through Celite. After the solvent was removed at room temperature in vacuo, there was obtained 35 grams of crude product which was distilled to give pure 1,2,3,4-tetrachloro-7-methyl-6,9-dioxa-1,3-spiro[4.4]nonadiene, boiling point 80° C. at 0.07 millimeter, as identified by gas chromatographic analysis.

Upon careful distillation, the pure sample boiled at 69° C. at 0.04 milliliter.

Analysis. — Calculated for $C_8H_8Cl_4O_2$: Carbon, 34.82%; Hydrogen, 2.19%; Chlorine, 51.40%. Found: C, 34.82%; H, 2.32%; Cl, 51.38%.

The use of hexabromocyclopentadiene will produce 1,2,3,4 - tetrabromo - 7 - methyl - 6,9 - dioxa - 1,3 - spiro [4.4]nonadiene.

The above examples illustrate the compounds of the invention corresponding to Formula A. Below are several examples of products corresponding to Formula B. Examples III to V demonstrate those compounds of Formula B which are produced from polyols, whereas Examples VI and VII demonstrate the similar compounds made from monohydric alcohols.

EXAMPLE III 1,2,4-trichloro-3-ethylenedioxy-6,9-dioxa-1-spiro[4.4]nonene

An ether solution of 1,2,3,4-tetrachloro-6,9-dioxa-1,3-spiro[4.4]nonadiene (0.20 mole, 52.4 grams) was added slowly at 65° C. to a flask containing 74.4 grams (1.20 moles) of ethylene glycol and 31.2 grams (0.60 mole, 85 percent purity) of potassium hydroxide. The ether was removed continuously during the addition by distillation at 20 millimeters vacuum. After all of the nonadiene was added and most of the ether was removed, the mixture was stirred at 65° C. to 70° C. for 22.5 hours. The reaction product was cooled slowly to room temperature, water was added, and the heterogeneous mixture was filtered. A solid was collected by filtration and was then distilled to give 34.4 grams of pure product, boiling point 120° C. to 130° C. at 0.04 millimeter. It was identified by gas chromatographic and infrared analysis, as well as chemical analysis.

Analysis.—Calculated for $C_9H_9Cl_3O_4$: Carbon, 37.59%; Hydrogen, 3.15%; Chlorine, 37.00%. Found: C, 37.95%; H, 3.46%; Cl, 37.48%.

The use of 1,2,3,4-tetrabromo-6,9-dioxa-1,3-spiro[4.4] nonadiene produces 1,2,4-tribromo-3-ethylenedioxy-6,9-dioxa-1-spiro[4.4]nonene.

EXAMPLE IV 1,2,4-trichloro-3-(1,2-propylenedioxy)-7-methyl-6,9-dioxa-1-spiro[4.4]nonene A three-necked, five-liter flask was charged with 12.1 moles (920 grams) of propylene glycol. Potassium hydroxide (10.7 moles, 600 grams, 85 percent purity) was added in portions until all was dissolved. To this solution 575 milliliters of dimethoxyethane and 250 milliliters of ligroin were added, and the mixture was refluxed at 62° C. Hexachlorocyclopentadiene (2 moles, 545.6 grams) was added dropwise to the refluxing mixture; the temperature went to 64° C. After all of the hexachlorocyclopentadiene was added, the mixture was stirred and refluxed at 59° C. for several hours while removing 35 milliliters of water. The product was then mixed with one liter of water and neutralized with dilute hydrochloric acid. The organic layer was washed with water and dried on a steam bath in vacuum. The oily residue was distilled and 342.6 grams of the product was collected at 0.1 to 0.45 millimeter. This crude product was redistilled to give 224.4 grams of the pure product, boiling point 102° C. at 0.038 millimeter pressure.

Analysis. — Calculated for $C_{11}H_{13}Cl_3O_4$: Carbon, 41.86%; Hydrogen, 4.15%; Chlorine, 33.70%. Found: C, 41.86%; H, 4.15%; Cl, 33.71%.

The use of hexabromocyclopentadiene produces 1,2,4-tribromo - 3 - (1,2 - propylenedioxy) - 7 - methyl - 6,9-dioxa-1-spiro[4.4]nonene.

EXAMPLE V

The same compound as in Example IV was also prepared by further reaction of 1,2,3,4-tetrachloro-7-methyl-6,9-dioxa-1,3-spiro[4.4]nonadiene with propylene glycol in the presence of potassium hydroxide, as follows: Four grams of potassium hydroxide were dissolved in 100 milliliters of propylene glycol at 80° C. To this solution was added a solution of 4.95 grams of 1,2,3,4-tetrachloro-7-methyl-6,9-dioxa-1,3-spiro[4.4]nonadiene in 5.0 milliliters of dimethoxyethane and the mixture was stirred for 20 hours at 60° C. Water and ether were then added to the reaction product and the ether layer was washed with water until neutral. The ether layer was then dried over anhydrous sodium sulfate and evaporated to yield 4.20 grams of an oily residue, which boiled at 120° C. at 0.1 millimeter and which was identified by infrared analysis as 1,2,4 - trichloro - 3 - (1,2 - propylenedioxy) - 7-methyl-6,9,-dioxa-1-spiro[4.4]nonene.

The use of 1,2,3,4-tetrabromo-7-methyl-6,9-dioxa-1,3-spiro[4.4]nonadiene produces 1,2,4-tribromo-3-(1,2-propylenedioxy)-7-methyl-6,9-dioxa-1-spiro[4.4]nonene.

EXAMPLE VI 3,3-dimethoxy-1,2,4-trichloro-6,9-dioxa-1-spiro[4.4]nonene

A three-necked, 500-milliliter, round bottom flask was charged with 54.4 grams (1.7 moles) of methanol and 31.2 grams (0.6 mole, 85 percent purity) of potassium hydroxide. At 65° C. to 70° C., 1,2,3,4-tetrachloro-6,9-dioxa-1,3-spiro[4.4]nonadiene (52.4 grams, 0.20 mole) in 60 milliliters of dimethoxyethane was added dropwise. The reaction mixture was stirred at 65° C. for 2 hours. Water and ether were added to the cooled product and the organic layer was washed with water three times, dried and distilled, yielding 54.5 grams of a fraction boiling at 88° C. to 90° C. at 0.03 to 0.035 millimeter. The distillate was added to petroleum ether (boiling point 35° C. to 60° C.) and the crystallized product was filtered. The solid, melting point 51° C. to 63° C., was recrystallized three times from ligroin to give 29.5 grams of the product, which melted at 67.5° C. to 68.5° C.

*Analysis.* — Calculated for $C_9H_{11}Cl_3O_4$: Carbon, 37.33%; Hydrogen, 3.83%; Chlorine, 36.74%. Found: C, 37.73%; H, 3.85%; Cl, 36.89%.

The use of 1,2,3,4-tetrabromo-6,9-dioxa-1,3-spiro[4.4]nonadiene produces 3,3 - dimethoxy - 1,2,4-tribromo-6,9-dioxa-1-spiro[4.4]nonene.

EXAMPLE VII

The same compound produced in Example VI was made as follows: Hexachlorocyclopentadiene was reacted with methanol in the presence of potassium hydroxide to produce 1,2,3,4-tetrachloro-5,5-dimethoxycyclopentadiene (52.8 grams, 0.20 mole), which was then added at 105° C. to a flask containing 74.4 grams (1.20 moles) of ethylene glycol and 31.2 grams (0.60 mole, 85 percent purity) of potassium hydroxide. The mixture was stirred for 2 hours and filtered. 12.5 grams of potassium chloride was separated. The filtrate was mixed with water and ether, and the ether layer was separated and washed until neutral. Crystallization from ligroin gave 48.5 grams of product, melting point 67° C. to 68.5° C. The 3,3-dimethoxy - 1,2,4 - trichloro - 6,9-dioxa-1-spiro[4.4]nonene was identified by mixed melting point, infrared spectra and gas chromatography.

The use of hexabromocyclopentadiene produces 3,3-dimethoxy-1,2,4-tribromo-6,9-dioxa-1-spiro[4.4]nonene.

In the manner of the above two-stage examples, the following compounds can also be prepared by further reacting 1,2,3,4-tetrachloro-6,9,-dioxa-1,3-spiro[4.4]nonadiene or 1,2,3,4-tetrabromo-6,9-dioxa-1,3-spiro[4.4]nonadiene with the appropriate alcohol:

1,2,4 - trichloro - 3(1,2 - hexanedioxy)-6,9-dioxa-1-spiro[4.4]nonene 1,2,4 - tribromo - 3(1,2 - hexanedioxy)-6,9-dioxa-1-spiro[4.4]nonene 1,2,4 - trichloro-3(cyclohexy-1,2-ethanedioxy)-6,9-dioxa-1-spiro[4.4]nonene 1,2,4 - tribromo-3(cyclohexyl-1,2-ethanedioxy)-6,9-dioxa-1-spiro[4.4]nonene 1,2,4 - trichloro -3 (phenyl-1,2-ethanedioxy)-6,9-dioxa-1-spiro[4.4]nonene 1,2,4 - tribromo-3(phenyl-1,2-ethanedioxy)-6,9,-dioxa-1-spiro [4.4]nonene 1,2,4 - trichloro-3(methoxy-2,3-propanedioxy)-6,9-dioxa-1-spiro[4.4]nonene 1,2,4 - tribromo-3(methoxy-2,3-propanedioxy)-6,9-dioxa-1-spiro[4.4]nonene 1,2,4 - trichloro-3(phenoxy-2,3-propanedioxy)-6,9-dioxa-1-spiro[4.4]nonene 1,2,4 - tribromo-3(phenoxy-2,3-propanedioxy)-6,9-dioxa-1-spiro[4.4]nonene 1,2,4 - trichloro - 3(6 - hydroxy - 1,2-hexanedioxy)-6,9-dioxa-1-spiro[4.4]nonene 1,2,4 - tribromo-3(6-hydroxy-1,2-hexanedioxy)-6,9-dioxa-1-spiro[4.4]nonene 1,2,4 - trichloro - 3,3-bis(4-hydroxy-1-butoxy)-6,9-dioxa-1-spiro[4.4]nonene 1,2,4 - tribromo-3,3-bis(4-hydroxy-1-butoxy-6,9-dioxa-1-spiro[4.4]nonene 1,2,4 - trichloro - 3,3(dioctyloxy)6,9 - dioxa-1-spiro-[4.4]nonene 1,2,4 - tribromo - 3,3(dioctyloxy)-6,9-dioxa-1-spiro[4.4]nonene While the examples show specific reactants, all the polyols and alcohols enumerated in the specification, as well as not specifically enumerated, are reactive in a similar manner to produce compounds within the scope of the invention.

Likewise, while the above examples demonstrate the invention using hexaclorocyclopentadiene, other hexahalocyclopentadienes, such as hexabromocyclopentadiene, and including cyclopentadiene derivatives containing different halogens in the same molecule, such as 1,2-dibromo - 3,4,5,5 - tetrachlorocyclopentadiene and 2,3-dibromo-1,4,5,5-tetrachlorocyclopentadiene are also contemplated for use herein and produce corresponding halogen-containing products. Similarly, although for clarity the invention has been described and exemplified using a single alcohol in each reaction step, mixtures of polyols or, in the appropriate instances, mixtures of monohydroxy alcohols can also be employed.

The compounds of this invention are useful in several varied applications. They find utility, for example, as insecticides. To exemplify their activity in this regard, the compound of Example VI, applied as a 2.5 percent solution in acetone topically to the thorax of houseflies (Wilson), effectively killed the flies.

While specific examples are given, all the compounds of the genus described in the specification and claims will show efficacy as insecticides.

In addition to their use as insecticides and in related applications, the compounds of the invention have various other uses, depending upon their particular properties. For example, compounds of Formula A and Formula B react with olefinic compounds to produce Diels-Alder addition products that can be utilized in making resinous materials in which halogens are sought to be introduced. For example, the reaction of the compound of Example II with maleic anhydride results in a material from which polyester resins can be obtained.

I claim:

1. A method of killing insects which comprises subjecting them to a lethally effective concentration of a compound of the formula:

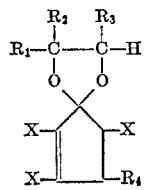

where X is halogen and $R_1$, $R_2$ and $R_3$ are each selected from the group consisting of hydrogen, alkyl, cycloalkyl, phenyl, alkoxyalkyl, phenyloxyalkyl and hydroxyalkyl and $R_4$ is selected from the group consisting of:

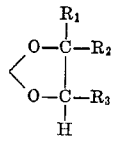

and

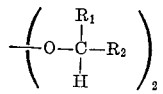

where $R_1$, $R_2$ and $R_2$ are as defined above.

2. A method of killing insects as in claim 1 which comprises subjecting them to a lethally effective concentration of a compound of the formula:

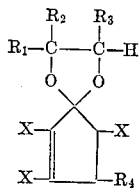

where X is halogen and $R_1$, $R_2$ and $R_3$ are each selected from the group consisting of hydrogen, alkyl, cycloalkyl, phenyl, alkoxyalkyl, phenyloxyalkyl and hydroxyalkyl containing 1 to 10 carbon atoms and $R_4$ is selected from the group consisting of:

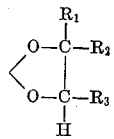

and

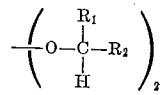

where $R_1$, $R_2$ and $R_3$ are as defined above.

3. A method of killing insects as in claim 1 which comprises subjecting them to a lethally effective concentration of an insecticidal composition comprising as an essential active ingredient the compound 3,3-dimethoxy-1,2,4-trichloro-6,9-dioxa-1-spiro[4.4]nonene.

References Cited

UNITED STATES PATENTS 2,905,697  9/1959  Schmerling _____ 107—33

OTHER REFERENCES

New-Comer et al., J.A.C.S 71, p. 946 (1949).

ALBERT T. MEYERS, *Primary Examiner.*

S. J. FRIEDMAN, *Assistant Examiner.*

U.S. Cl. X.R.

260—340.9.